United States Patent [19]

Long

[11] Patent Number: 5,626,933
[45] Date of Patent: May 6, 1997

[54] MODULAR FLOOR COVER

[76] Inventor: Marcel Long, 2271 Rue Centrale, Saint-Hilaire, N.B., Canada, E3V 4V9

[21] Appl. No.: 585,724

[22] Filed: Jan. 16, 1996

[51] Int. Cl.$^6$ .................... B32B 3/02; B32B 7/08; A47K 7/02
[52] U.S. Cl. .................... 428/52; 428/53; 428/54; 428/88; 428/95; 15/215
[58] Field of Search .................... 428/52, 53, 54, 428/95, 88; 15/215

[56] References Cited

U.S. PATENT DOCUMENTS

| | | | |
|---|---|---|---|
| 2,181,812 | 11/1939 | Kammerer | 428/52 |
| 2,388,297 | 11/1945 | Slaughter | 428/53 |
| 4,804,570 | 2/1989 | Bedics | 428/53 |
| 4,952,434 | 8/1990 | Rumsey et al. | 428/53 |
| 5,157,804 | 10/1992 | Williams | 428/53 |
| 5,190,799 | 3/1993 | Ellingson, III | 428/53 |
| 5,205,092 | 4/1993 | Taylor | 428/53 |
| 5,308,670 | 5/1994 | Saylor | 428/81 |
| 5,536,547 | 7/1996 | Simpson | 428/53 |

*Primary Examiner*—Terrel Morris
*Attorney, Agent, or Firm*—Mario D. Theriault

[57] ABSTRACT

A modular floor cover for a garage floor, made of a plurality of strips of impermeable ribbed matting. The strips are laterally joined to one-another by elongated moldings. A first series of elongated joiners encloses common bordering edges of adjacent strips of ribbed matting, raising the longitudinal edges by a thickness of a sole member of these moldings. A second series of joiners is placed under all transversal edges of the strips, thereby raising the transversal edges. A basin is formed in a central region of the floor cover to retain water, slush and other fluids falling off a vehicle parked over this floor cover.

20 Claims, 5 Drawing Sheets

MODULAR FLOOR COVER

FIELD OF THE INVENTION

The present invention relates to an impermeable cover for a garage floor. More particularly, the present invention relates to a carpet for a garage floor, made of a plurality of strips of ribbed matting material joined to each other by elongated joiners.

BACKGROUND OF THE INVENTION

Melting snow falling off a vehicle, and especially the road salt from the snow accumulating under a vehicle during winter driving, is known to erode cement floors and to stain the bases of wooden walls in contact with such saline composition. Similarly, any amount of grit, mud, dirt, lubricants, and various fluids dripping off a vehicle while it is parked in a garage, deteriorates floor paints and a general tidiness of the building.

For these reasons, it is preferable to provide beneath a vehicle parked in a garage, a floor cover to catch and contain water, slush and grime falling off the vehicle.

A floor cover of the prior art is disclosed in U.S. Pat. No. 5,308,670, issued on May 3, 1994 to Steven S. Saylor. The rectangular pad for garage floor disclosed therein has all sides raised by means of a pocket along each outer edge, enclosing a reinforced rubber hose. The pad is in one piece for covering an entire space under a parked vehicle. The reinforced rubber hoses are each the full length of a respective edge of the pad.

Another carpet material of the prior art is a rubber-like corrugated PVC matting commercially known as a wide-ribbed vinyl matting. The matting material has a substantial thickness to resist studded winter tires, and its plastic construction is suitable to retain saline and petroleum compositions. A major drawback, however, is that the material is extruded in strips having a commonly available width of 36 inches and a maximum width of less than 60 inches.

Covers for garage floors should meet certain requirements in order to successfully support a manufacturing operation therefor. For example, an impermeable cover for garage floors must appeal to clients as well as to retailers.

To a client, an impermeable carpet should be able to retain a volume of water at least equivalent to the snow and ice accumulating under a vehicle during few uses of this vehicle. Moreover, an impermeable carpet for a garage floor should have relatively low sides such that a car driving over the edge thereof will not displace it.

To a retailer, an impermeable carpet for garage floor must be saleable in a compact package taking little space in a retail establishment. Another important requirement is that a buyer should be able to transport the carpet in his own vehicle, and to install it without the assistance of service personnel.

In this regard, the carpets for garage floors of the prior art lack one or more of the above attributes.

SUMMARY OF THE INVENTION

In the present invention, however, there is provided a modular floor cover having a plurality of strips of impermeable ribbed matting. The modular floor cover also comprises a first elongated joiner means enclosing a common longitudinal bordering edge of any two adjacent strips of ribbed matting, and a second elongated joiner means having an overall thickness, being placed under all transversal edges of each strip.

A plurality of valleys between ribs of the ribbed matting and between spaced apart second elongated joiner means, form a basin for retaining water, slush, automotive fluids and debris falling off a vehicle when that vehicle is parked over the floor cover.

A first advantage of the floor cover of the present invention is that a user may enlarge or reduce the cover by adding or removing strips, according to a floor surface to be covered. Moreover, a user may cut out a portion of any strip to outline the floor cover around curbs, openings or other obstructions on that surface, while a water retention ability of each strip is maintained.

In accordance to another aspect of the present invention, the first and second elongated joiner means of the modular floor cover are a same elongated joiner type comprising a sole member having a nominal thickness and a flat cross-section, a cap member having a nominal width and being held at a distance from the sole member by a tie member, such that a pair of longitudinal slots between the sole member and the cap member extend approximately equally and in opposite direction to one-another from the tie member.

Each of the longitudinal slots has at least one groove engaging with a rib on the strips of ribbed matting, for retaining two adjacent strips of ribbed matting in a fixed lateral relative position.

A modular floor cover of the present invention comprising a plurality of strips of ribbed matting joined with elongated joiners as just described, and the ends of which being raised also by these elongated joiners, have outside edges of a relatively low profile.

A volume of a basin provided by the valleys between the ribs of matting, and by the elevation of the longitudinal edges of the floor cover from the nominal thickness of the sole member of the elongated joiners, is sufficient for most car garage applications.

A primarily advantage of the edges having a low profile is that the floor cover remains in place when a vehicle drives over it. This aspect of a floor cover is also important to a handicapped individual travelling to his car in a wheelchair, and to elderly people vulnerable to obstacles projecting from a floor.

In accordance to a further aspect of the present invention, the modular floor cover is marketed in the form of a kit for covering a nominal surface of a floor. This kit comprises a nominal length of ribbed matting material having a nominal width. This nominal length of ribbed matting material is rolled up in a cylindrical form, and held in this form by strapping bands. Several elongated joiners are bundled up into the core of this cylindrical form.

The modular floor covering kit of the present invention is advantageously displayed for sale in a compact form, taking little space in a store and in a warehouse. The compact package may also be transported by a buyer in a trunk of a car.

BRIEF DESCRIPTION OF THE DRAWINGS

The preferred embodiment of the invention will be further understood from the following description, with reference to the drawings in which.

DETAILED DESCRIPTION OF THE PREFERRED EMBODIMENT

Figure 1:
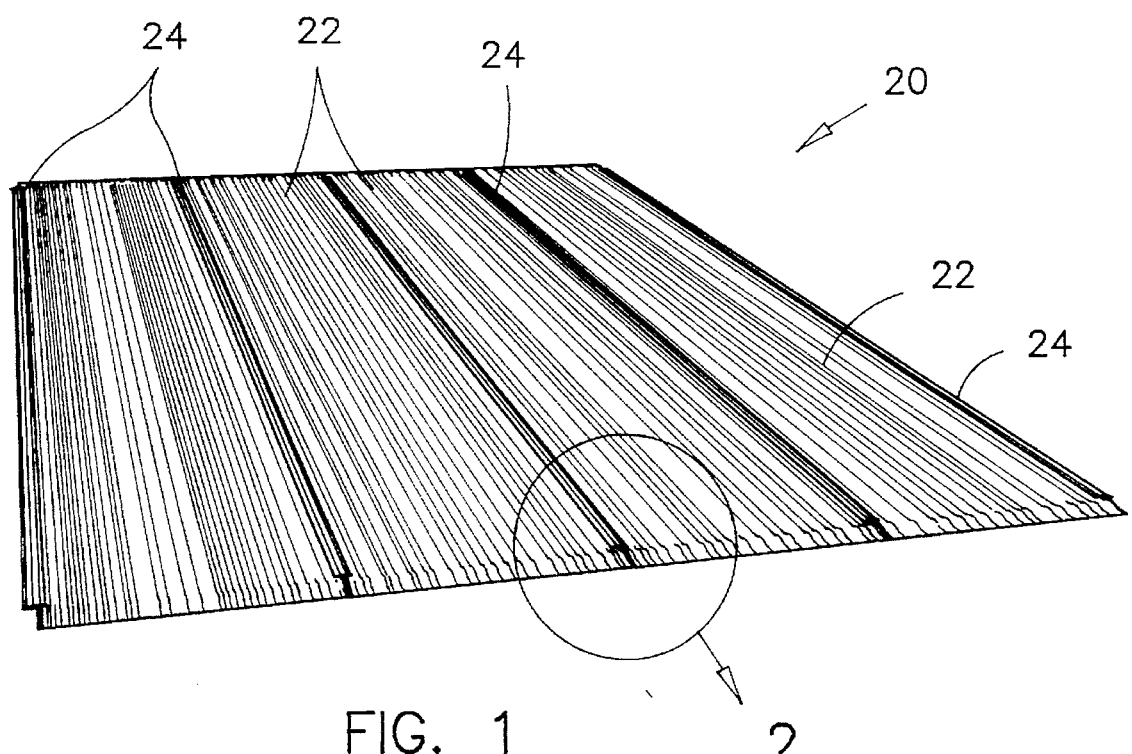
FIG. 1 is a front and top perspective view of a modular floor cover having four strips of ribbed matting material.

Referring to FIGS. 1 to 7, there is illustrated a carpet for a garage floor 20 made of four strips 22 of ribbed impermeable matting material. The preferred ribbed impermeable matting material is a commercially known wide-ribbed vinyl (Polyvinyl chloride, PVC) matting material having a nominal thickness of 0.125". Each strip is longitudinally held to an adjacent strip by means of an elongated joiner 24.

The elongated joiner 24 of the preferred embodiment has a sole member 26 and a cap member 28 retained to the sole member 26 by a tie member 30. The cap member 28 is spaced from the sole member 26 such that a pair of longitudinal slots 32 are formed therebetween, and wherein each slot 32 extends transversally in opposite direction to one-another from tie member 30.

Each longitudinal slot 32 of an elongated joiner 24 has in a wall facing the sole member 26 a groove 34, 34' the shape of which corresponds to one rib 36 of a wide-ribbed vinyl matting material 22. A preferred distance between a groove 34 and tie member 30 is slightly more that a spacing between two adjacent ribs 36 of matting material 22.

The sole member 26 of an elongated joiner 24 is slightly curved when loose, in a direction away from cap member 28. The curvature of the sole member 26 enlarges an opening of each slot 32, such that the joiner 24 is easier installed over a longitudinal edge of the ribbed matting material 22.

The sole member 26 further has a plurality of longitudinal serrations 38 on a base face thereof. These serrations 38 serve a first purpose of adding transversal flexibility to the sole member 26 such that it may be easily flexed further away from cap member 28 during installation of the joiner 24. A second purpose of the serrations 38 is to increase a friction of the sole member 26 against a floor surface to prevent a lateral displacement thereof when a wheel of a vehicle rolls over it.

The elongated joiner 24 is preferably made of a flexible PVC material having a similar mechanical properties than those of the ribbed matting material 22. An advantage of having similar material for the elongated joiner 24 and the ribbed matting 22 is that both pieces may optionally be bonded together with a common PVC cement.

Figure 2:
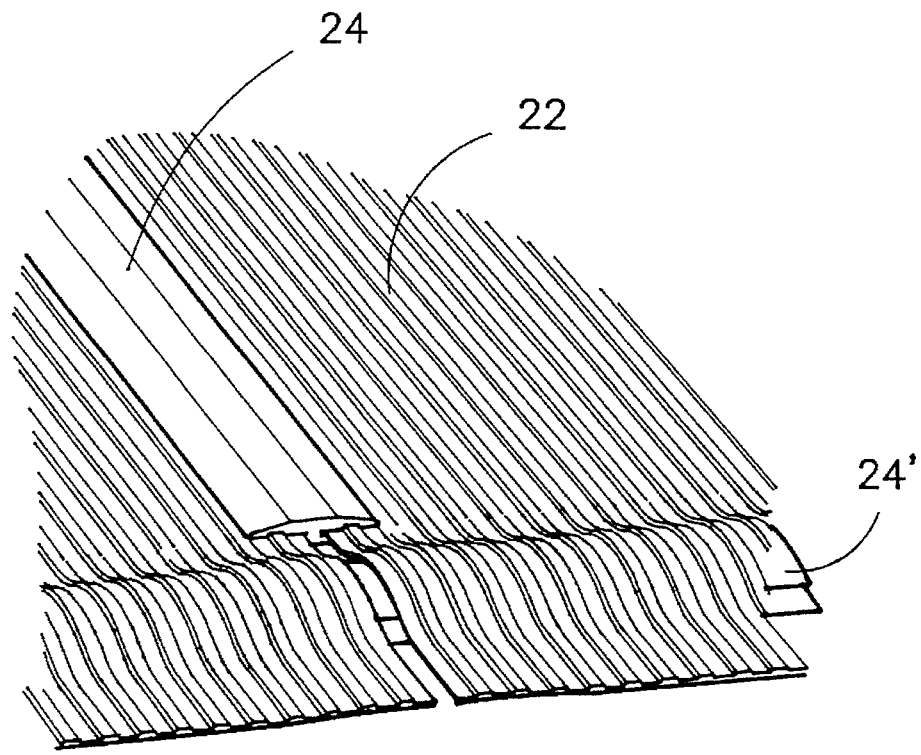
FIG. 2 is an enlarged view of detail 2 of FIG. 1. The figure illustrates a first method of installing a joiner between two strips of ribbed matting material.
Figure 5:
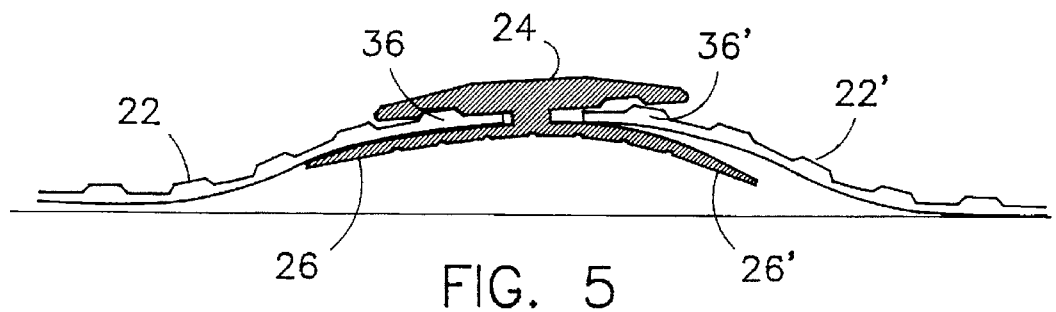
FIG. 5 illustrates a suggested method for joining two strips of ribbed matting material with a joiner of the preferred embodiment.
Figure 7:
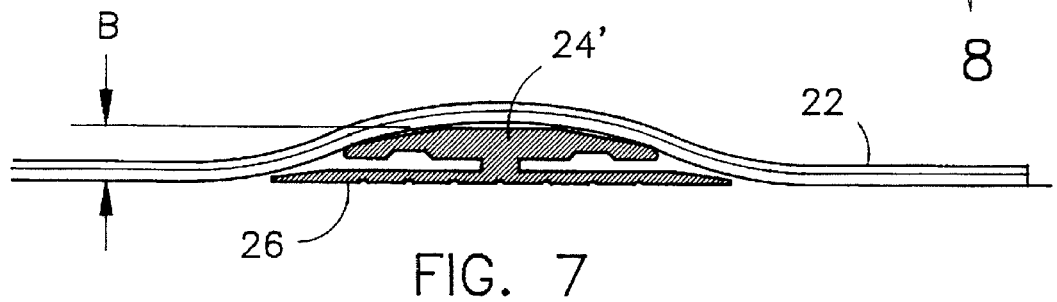
FIG. 7 is a joiner under a transversal edge of a strip of ribbed matting material.

A preferred method of installing an impermeable carpet of the preferred embodiment over a garage floor for example, typically comprises the following steps:

a) Laying strips of ribbed matting material 22 side by side on the floor to be covered, with the common bordering edge of each strip 22 nearly touching each other, or at a spacing therebetween of not more than about ¼". Cutting out portions of strips of matting material 22 around a stairwell, a partition or other surface variations on that floor.

b) Inserting a joiner 24 along a longitudinal edge of a first strip of matting material 22, with an outer rib 36 of that strip 22 mating with a corresponding groove 34 inside slot 32. The placement of an elongated joiner 24 along the longitudinal edge of this first strip 22 is facilitated by bending a first side of the sole member 26 downwardly for opening a corresponding slot 32.

c) Bending a second side of sole member 26' downwardly and inserting it under a longitudinal edge of the second strip of ribbed matting material 22', adjacent the first strip 22, as shown on FIG. 5.

d) Pushing the joiner 24 downwardly against the floor, thereby straightening sole member 26, 26', closing slots 32, 32' and interlocking ribs 36, 36' of strips of matting material 22, 22' into a respective groove 34, 34'.

e) Similarly installing joiners 24 along the longitudinal edges of all strips of matting material comprised in the floor cover 20. Optionally terminating joiners 24 at six to eight inches from the ends of strips of matting material 22, as illustrated on FIG. 2.

f) Installing under and along the transversal edges of each strip of matting material 22, an elongated joiner molding 24' as illustrated on FIG. 7. Using the end of joiners 24 along each longitudinal edges as stoppers to align joiner 24' in a parallel relationship with the outer transversal edges of the floor cover 20, as illustrated in FIG. 2.

The longitudinal edges of each strip of ribbed matting material 22 are raised into a 24 a thickness "A" of the sole member 26. The transversal edges of the floor cover 20 of the preferred embodiment are also raised, a thickness "B" of joiner 24'. Thus a central portion of each strip of ribbed matting material 22 forms a basin to catch and retain water, mud and other debris falling off a vehicle parked over that carpet 20.

Figure 8:
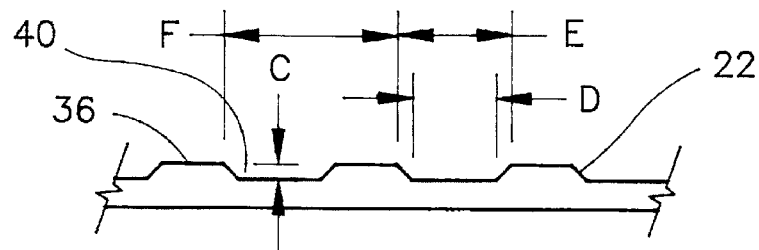
FIG. 8 is an enlarged view of detail 8 of FIG. 6. The figure illustrates some typical dimensions of a wide-ribbed matting material.

Referring now to FIG. 8, there is illustrated for informative purposes only, the common dimensions of commercially known wide-ribbed floor matting material 22 recommended for this floor cover of the preferred embodiment. A depth of each valley 40 is: "C": 0.050 inch. A width of each valley 40 is: at the bottom "D": 0.300 inch, and at the top "E": 0.400 inch. A typical spacing between each valley 40 is: "F": 0.575 inch.

Thus a strip of ribbed matting 22 over a flat floor for example having a width of three feet, a length of twenty feet, and both ends raised a thickness "B" of 0.355 inch by a transverse joiner 24' placed at six inches from each end, will contain a volume of 0.93 U.S. gallon within the valleys 40 of that strip 22.

When considering a floor cover 20 as illustrated on FIG. 1, having four strips of ribbed matting material 22 as just described, all longitudinal edges and joints thereof are raised by a thickness "A" of 0.075 inch of sole member 26. The liquid retention capacity of that entire carpet 20 is thereby approximately 12.96 U.S. gallons.

This volume is sufficient for most car garage applications, where the evaporation of water compensates for periodic additions of snow and slush brought in by a vehicle during or shortly after each winter storm.

Figure 3:
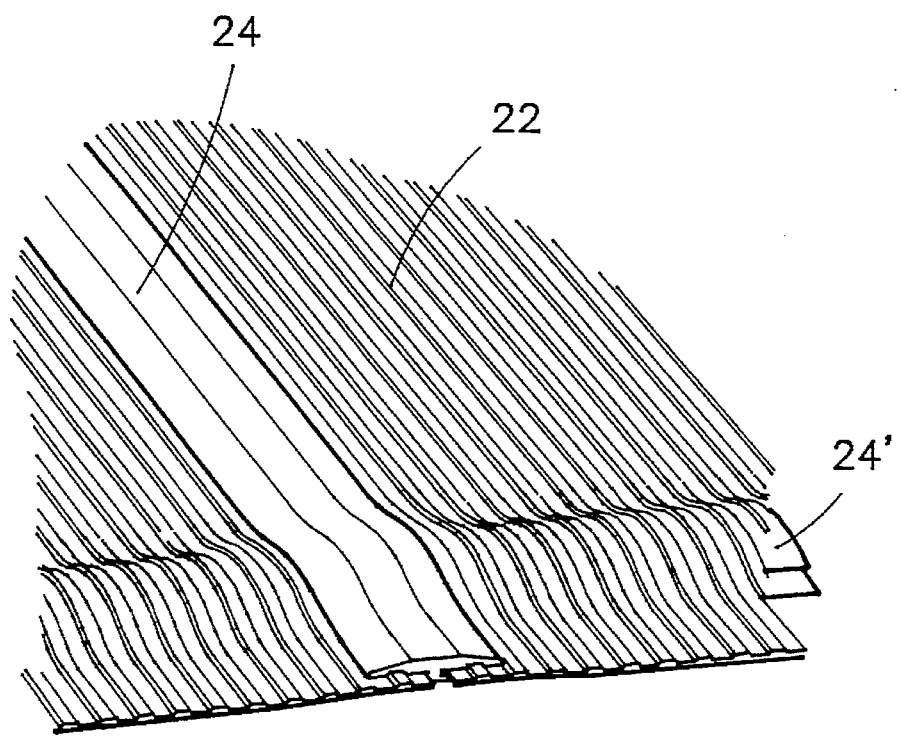
FIG. 3 illustrates a second method of installing a joiner between two strips of ribbed matting material.
Figure 4:
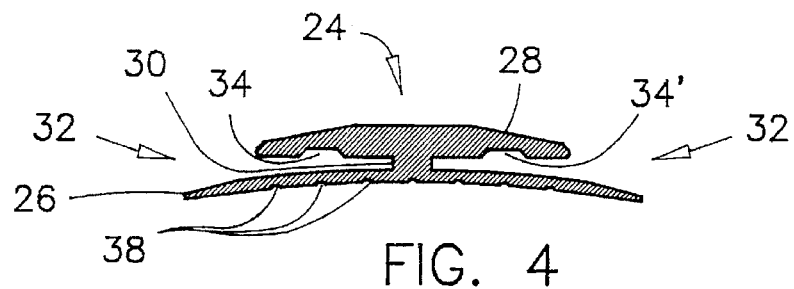
FIG. 4 is a typical cross section of a joiner of the preferred embodiment of the present invention.

As a further alternative, however, the floor cover of the preferred embodiment may be installed with the joiner 24 extending the full length of each strip of ribbed matting 22, as illustrated on FIG. 3. In this further alternative, it is recommended to apply PVC cement inside slots 32 when installing the elongated joiner 24 on the longitudinal edges of the ribbed matting 22, to bond together each strips 22 and each joiner 24 of the entire floor cover 20. A PVC cement recommended for this application is a PVC cement generally available in plumbing hardware stores.

Figure 6:
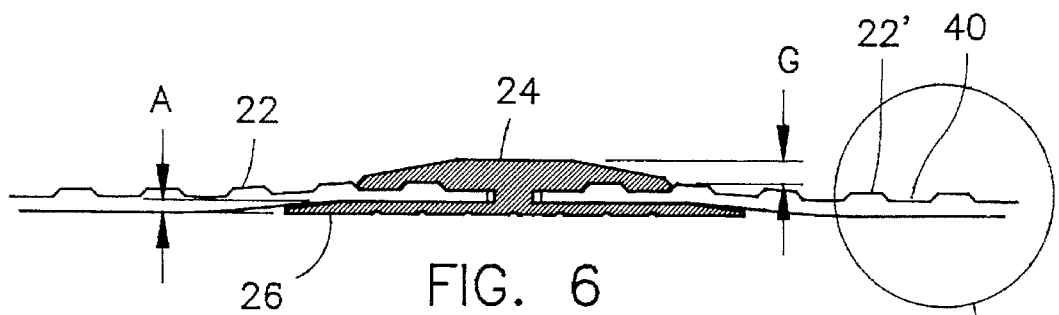
FIG. 6 illustrates a final assembly of a joiner between two strips of ribbed matting material.

In such a sealed installation, the height of the basin is thereby increased by a distance "G" of 0.150 inch above the outermost ribs of each strip, as shown on FIG. 6. The volume of the basin of this further alternative is approximately 32 U.S. gallons.

This further alternative is recommended for applications where the floor cover is installed permanently. The installation without adhesive as firstly described is suggested for those applications where the carpet may be removed or rolled up during warm seasons.

A suggested method for cleaning the floor cover of the preferred embodiment is to use a broom to wipe water, slush and dirt in a longitudinal direction over one of the transversal outer edges of the floor cover 20. When small quantities of debris are evacuated, wiping can be done without removing a transversal joiner 24' from under a transversal outer edge. However, when a large volume of water must be moved, it is recommended to remove a transversal joiner 24', to let water flow out of a garage for example, from one end of the carpet 20, before wiping it clean with a broom or a mop.

Figure 9:
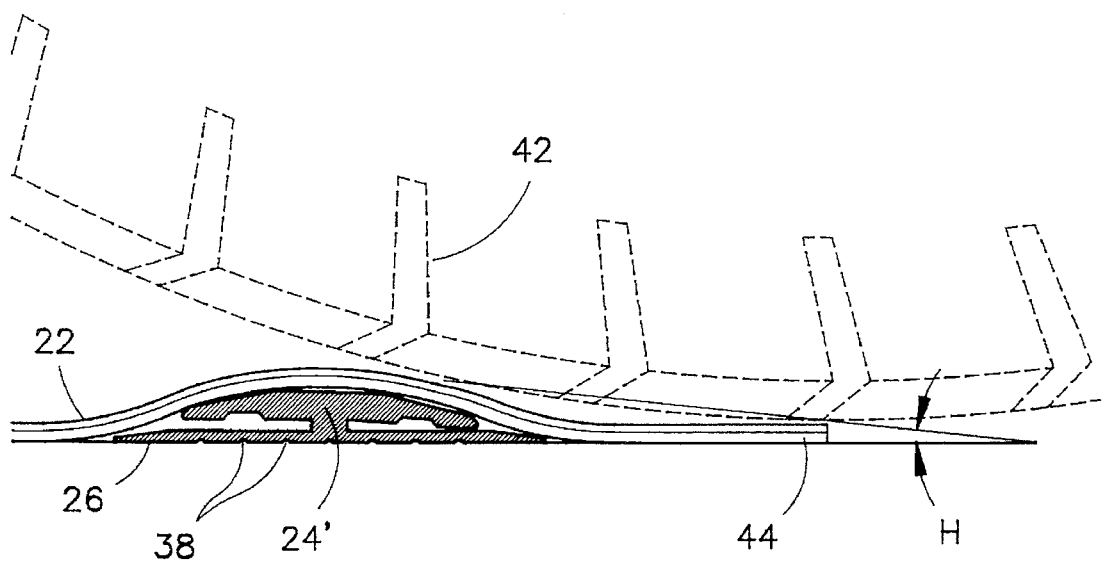
FIG. 9 illustrates partly a car wheel rolling over a joiner placed under a transversal edge of a strip of ribbed matting material.

According to an aforesaid recommendation to install the transversal joiners 24' at approximately six to eight inches from a transversal edge of the floor cover 20 provides the following additional advantages. For example, a car wheel 42 having an overall diameter of twenty-five inches as partly illustrated on FIG. 9, rolling over a transversal edge 44 of a floor cover 20, squeezes the transversal edge 44 before pressing against transversal joiner 24'. Thus when the car wheel 42 climbs over the transversal joiner 24', this joiner 24' is held in place by the covering strip of ribbed material 22 being squeezed under the car wheel 42.

The transversal joiner 24' is also held in place from a friction force of the sole member 26 and of the longitudinal serrations 38 against the floor surface. The transversal joiner 24' is further retained in place from a low angle of climbing of the car wheel 42 thereover. This angle of climbing is illustrated by label "H" on FIG. 9. An overall thickness "B", 0.355 inch, of elongated joiner 24', and an overall width of sole member of three inches for example, give an angle of climbing "H" of approximately 6°. The tangent ratio of a 6° angle is 0.10. Hence, a vertical retaining force exerted by the car wheel 42 over the transversal joiner 24' is ten times more than a lateral force applied thereon. For these reasons, the edges of the floor cover of the preferred embodiment remain in place despite frequent movements of a vehicle over these edges.

The wide-ribbed matting material of the preferred embodiment has the additional advantage of being thick enough to resist studded tires of an automobile, and of having a non-slippery upper surface desirable for car garage applications.

Figure 10:
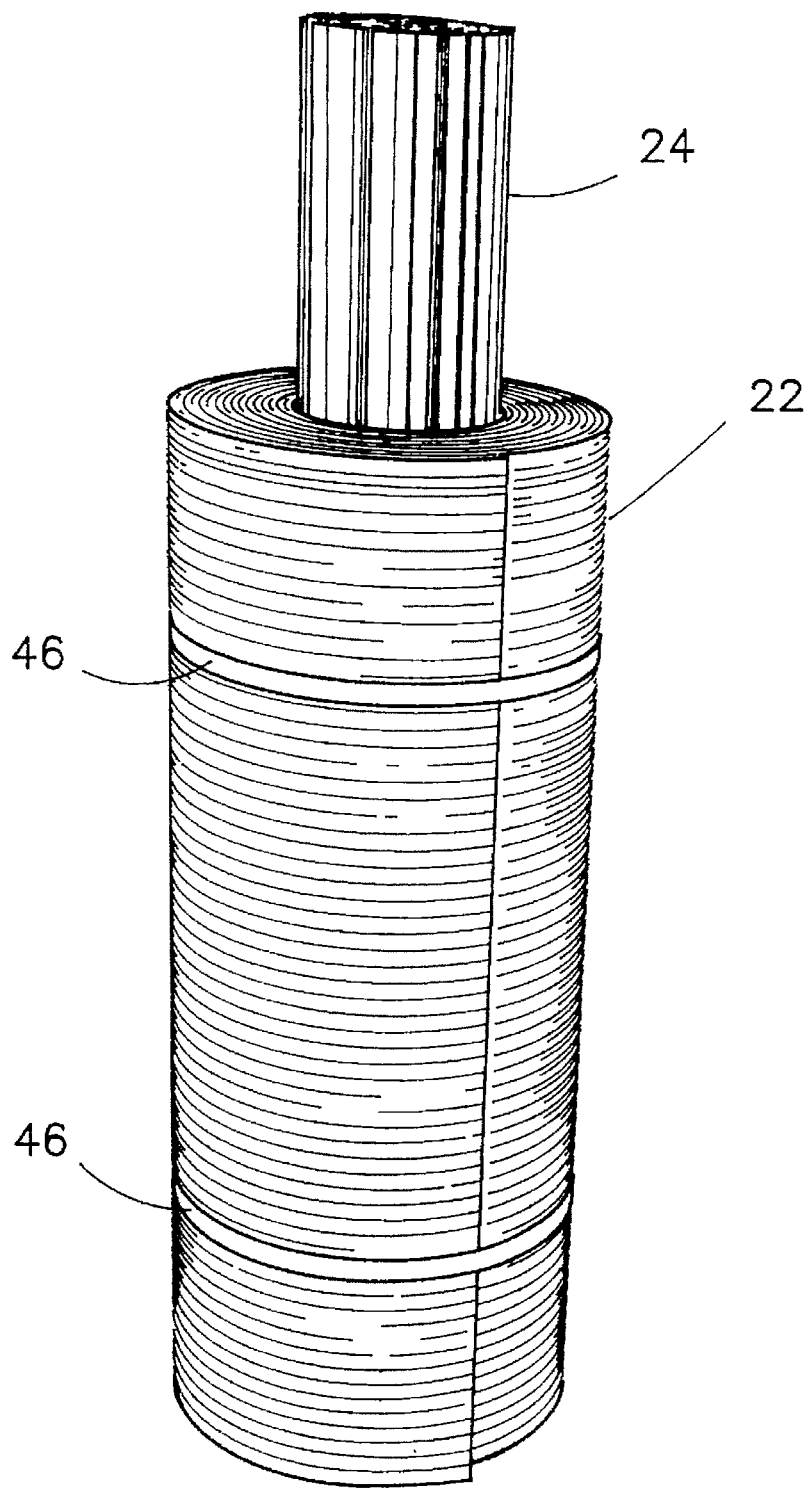
FIG. 10 is a front and top perspective view of a floor covering kit comprising a nominal area of ribbed matting material and a plurality of elongated joiners, packaged in a cylindrical form.

A preferred method for packaging for sale the floor cover 20 of the preferred embodiment is to roll it up and to tie it with strapping bands 46 as illustrated on FIG. 10. A floor cover of twelve feet wide by twenty feet long for example, can be packaged in the form of a fifteen inches diameter cylinder. The cylinder may contain in a seven inches diameter central core, a total of one hundred and twenty four feet of joiners 24 as described herein, in forty-eight inches lengths. The ribbed matting material of this example is in thirty-six inches wide strips, and may be rolled up in four thicknesses of twenty feet each. The ribbed matting may also be rolled up as a continuous strip which is later trimmed by a buyer according to a specific surface to be covered.

The floor cover of the preferred embodiment is relatively easy to manufacture, wherein the labour costs are limited to cutting lengths of strips of matting materials 22, and of extruded joiners 24, and to rolling and tieing the product in a cylindrical package.

This description of a preferred embodiment of the present invention, shall not constitute a limitation in the scope of its applications. Also it shall not constitute a limitation in the possible configuration of its elements. Other methods for joining ribbed matting material to form impermeable floor covers may be derived from the embodiment thus described without offering significant improvement over the stated advantages.

Therefore, the preferred embodiment of the present invention as described herein is not limited thereto, and it will be apparent to those skilled in the art that numerous modifications form part of the present invention insofar as they do not depart from the spirit, nature and scope of the described and claimed invention.

I claim:

1. A modular floor cover comprising:
    at least two rectangular strips of impermeable ribbed matting laid side-by-side on a floor, with adjacent longitudinal edges thereof being spaced apart from one-another a distance of a nominal gap, said plurality of rectangular strips defining an overall floor covering area having a perimeter comprised of two outermost longitudinal edges and two transversal edges being substantially at right angle with said outermost longitudinal edges;
    a first elongated joining means enclosing said gap and said adjacent longitudinal edges;
    a second elongated joining means having an overall thickness, located under said transversal edges;
    whereby a plurality of valleys between the ribs of said ribbed matting and between said second elongated joining means, form a basin of a first level for retaining water, slush, automotive fluids and debris falling off a vehicle when said vehicle is parked over said floor cover.

2. A modular floor cover as claimed in claim 1 wherein said first elongated joining means is similar in dimensions and mechanical properties to said second elongated joining means.

3. A modular floor cover as claimed in claim 2 wherein said first elongated joining means has mechanical properties similar to mechanical properties of said strips of ribbed matting.

4. A modular floor cover as claimed in claim 1 wherein said ribbed matting is a wide-ribbed PVC matting having a nominal thickness of 0.125 inches.

5. A modular floor cover as claimed in claim 1 wherein;
    said first elongated joining means is also installed on said outermost longitudinal edges, and wherein;
    said first elongated joining means has a sole member having a first nominal thickness, said sole member projecting under said strips and raising all said adjacent longitudinal edges and said outermost longitudinal edges a distance corresponding to said first nominal thickness;

whereby a height of said basin is raised to a second level and said basin is increased in volume by a factor substantially proportional to an area of said basin times said first nominal thickness.

6. A modular floor cover as claimed in claim 5 wherein said first nominal thickness of said sole member is about 0.075 inches.

7. A modular floor cover as claimed in claim 5 wherein;

said first elongated joining means also has a cap member projecting vertically a second nominal thickness above said second level, and said first elongated joining means is bonded to all said adjacent longitudinal edges and to said outermost longitudinal edges, whereby said basin is further increased in volume by a second factor substantially proportional to an area of said basin times said second nominal thickness.

8. A modular floor cover as claimed in claim 7 wherein said second nominal thickness is about 0.150 inches.

9. A modular floor cover as claimed in claim 1 wherein said first elongated joiner means comprises:

a sole member having a nominal thickness and a flat cross-section, a cap member having a nominal width, said cap member being held at a distance from said sole member by a tie member such that a pair of longitudinal slots between said sole member and said cap member extend approximately equally and in opposite direction to one-another from said tie member, each of said longitudinal slots having groove means engageable with ribs on said ribbed matting strips, for retaining said two adjacent strips of ribbed matting in a fixed lateral relative position.

10. A modular floor cover as claimed in claim 9 wherein said sole member has a lower face engageable with said floor, and said lower face has a plurality of serrations for enhancing a friction of said lower face against a surface of said floor.

11. A modular floor cover as claimed in claim 9 wherein said groove means is at least one groove the shape of which corresponds to one rib on said strip of ribbed matting.

12. A modular floor cover as claimed in claim 11 wherein a horizontal distance between said groove and said tie member is at least a width of a valley between any two adjacent said ribs.

13. A modular floor cover as claimed in claim 9 wherein an overall width of said sole member is about 3 inches, and a total thickness of said elongated joiner is about 0.355 inch.

14. An elongated joiner for joining two adjacent strips of ribbed floor matting comprising:

a sole member having a nominal thickness and a first width, a cap member having a second width, said cap member being held at a distance from said sole member by a tie member such that a pair of longitudinal slots between said sole member and said cap member extend approximately equally and in opposite direction from one-another from said tie member, each of said longitudinal slots having groove means engageable with ribs on said strips of ribbed floor matting, and said sole member is curved away from said cap member such that each of said longitudinal slots has a cross-section tapering outwardly from said tie member.

15. An elongated joiner as claimed in claim 14 wherein said sole member has a lower face engageable with a floor surface, and said lower face has a plurality of serrations for enhancing a transversal flexibility of said sole member.

16. An elongated joiner as claimed in claim 14 being made of a flexible PVC material.

17. An elongated joiner as claimed in claim 14 wherein a ratio of an overall thickness thereof over said first width is about 0.10.

18. A floor covering kit comprising:

a nominal length of ribbed matting material having a nominal width, said nominal length of said ribbed matting material being rolled up in a cylindrical form;

a plurality of pieces of elongated joining means bundled up as a core of said cylindrical form;

said elongated joining means having slot means for joining two adjacent strips of said fibbed matting material by enclosing simultaneously common bordering longitudinal edges of both said two adjacent strips.

19. A floor covering kit as claimed in claim 18 wherein said cylindrical form is tied with strapping bands.

20. A floor covering kit as claimed in claim 18 wherein said nominal length times said nominal width represents an area of about 240 square feet, and said cylindrical form has a diameter of about 15 inches.

* * * * *